(No Model.) 2 Sheets—Sheet 1.
J. F. HESS.
BLOWER FOR STOVES AND FIRE PLACES.
No. 358,447. Patented Mar. 1, 1887.
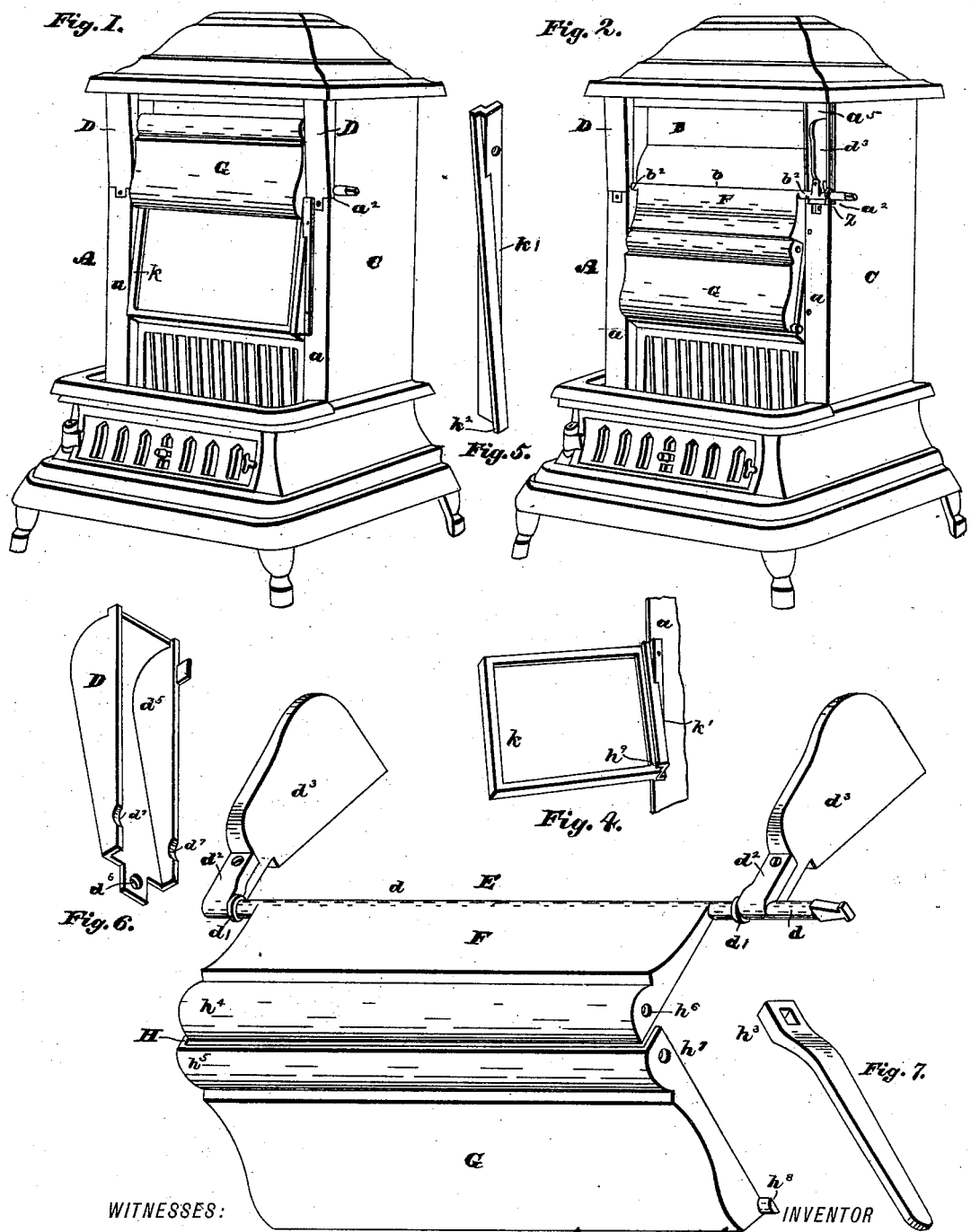
WITNESSES:
Harry Frease
Chas. R. Miller
INVENTOR
Jacob F. Hess
BY
W. K. Miller
ATTORNEY (No Model.) 2 Sheets—Sheet 2.

J. F. HESS.
BLOWER FOR STOVES AND FIRE PLACES.

No. 358,447. Patented Mar. 1, 1887.

WITNESSES:
Harry Frease
Chas. R. Miller

INVENTOR
Jacob F. Hess
BY
W. K. Miller
ATTORNEY

N. PETERS, Photo-Lithographer, Washington, D. C.

UNITED STATES PATENT OFFICE.

JACOB F. HESS, OF MASSILLON, OHIO.

BLOWER FOR STOVES AND FIRE-PLACES.

SPECIFICATION forming part of Letters Patent No. 358,447, dated March 1, 1887.

Application filed August 20, 1886. Serial No. 211,440. (No model.)

*To all whom it may concern:*

Be it known that I, JACOB F. HESS, a citizen of the United States, and a resident of Massillon, county of Stark, State of Ohio, have invented a new and useful Improvement in Blowers for Stoves and Fire-Places, of which the following is a full, clear, and exact description, reference being had to the accompanying drawings, making part of this specification.
My invention relates to improvements in adjustable blowers for stoves and fire-places; and it consists in providing means, hereinafter described, by which a blower may be balanced by counter-weights and held at any desired point of adjustment; also, in providing means for uniting the counter-weight, that uniformity of movement may be secured.

My invention also relates to and consists in providing a way upon which the blower may rest when down and slide upon when raised or lowered; also, in providing means for restraining and guiding the blower in its up-and-down movement.

My invention also relates to the detail and combination of parts, as hereinafter described, and set forth in the claims.

Figure 9:
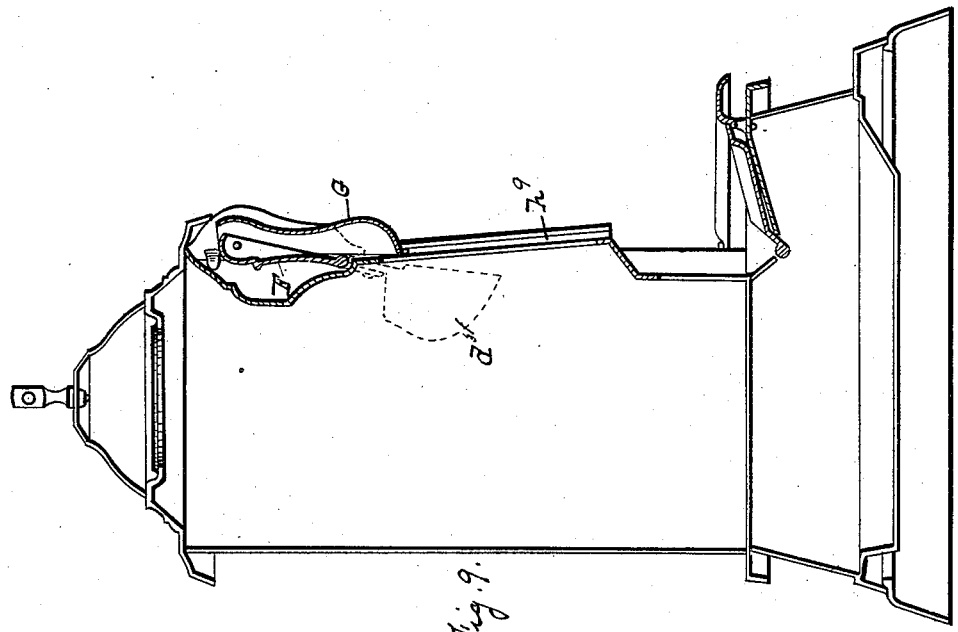
Figure 8:
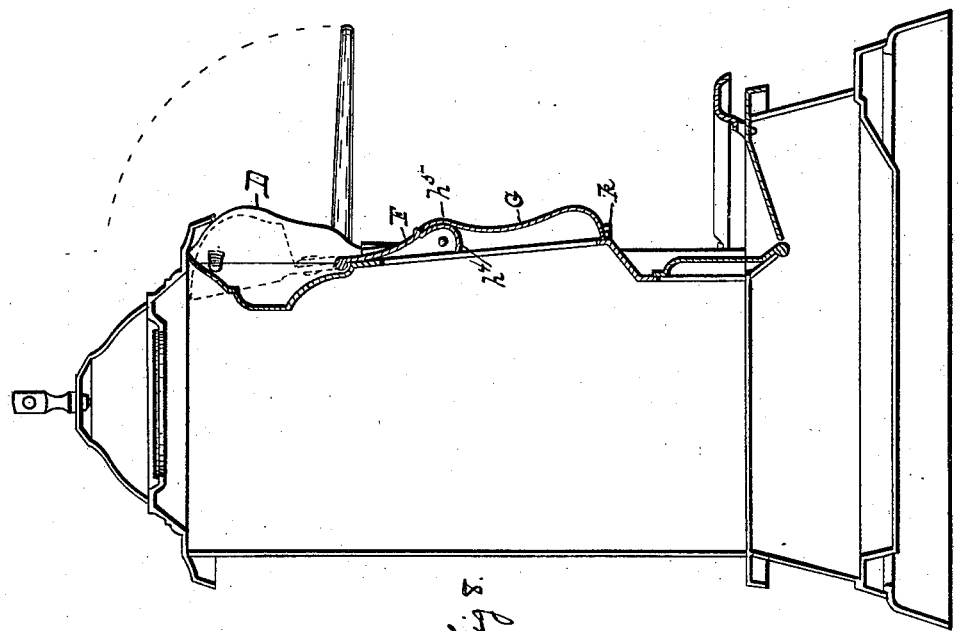

Similar letters of reference indicate corresponding parts in all of the figures of the drawings.
Figure 1 is an isometrical view of a stove embodying my invention, showing the blower raised and folded into a recess provided therefor in the upper section of the stove. Fig. 2 is same view showing the blower down, exposing the recess and the detail of one end of the cross-shaft forming the blower-hinge and the counter-weights and chamber. Fig. 3 is an isometrical view of the blower and counter-weight, lower section of blower detached.
Fig. 4 is an isometrical view of a fragment of the front plate, showing that part of the plate upon which the blower slides when raised or lowered and upon which it may rest when down, and also showing the restraining-groove.
Fig. 5 is an isometrical view of the plate that forms the restraining-groove from the left-hand front. Fig. 6 is a view of a cap or cover for counter-weight chamber. Fig. 7 is a view of a hand-wrench, by which the blower gradually may be rotated. Fig. 8 is a view in vertical section, showing the blower in its lowered position; and Fig. 9 is a similar view showing the blower elevated.

In the construction of a stove embodying my improvements, the fire box or grate may be inclosed, in the usual way, with outside and lining plates and top and bottom plates, except such changes or modifications as may be required to adapt them to the use of my improvements.

The blower E is composed of two sections, F and G, section F having at its upper side a supporting-shaft, $d$, having journals $d'$, which may be integral therewith, and is also provided with projected wings $d^2$, and to which there may be attached counter-weights $d^3$, of such weight as may be required to balance and hold the blower at any desired position of elevation between the limits of its movements; or the counter-weights may be integral with the said shaft, and the end of the shaft $h$ may be so formed and adapted as to conform to the wrench $h^3$, by which the shaft may be rotated and the blower raised or lowered, as the case may be.

The lower section, G, of the blower has a hinge-connection with the lower edge of the upper section, F, the adjacent edges of the two sections $h^4 h^5$ being curved, as shown in Fig. 3, and conformed one to the other and held in position by a bolt adapted to perforations $h^6$ $h^7$, which are central to the said curved edges $h^4 h^5$, thereby forming a longitudinal hinge, by which the lower section, G, of the blower may be folded against the inside of the upper section, F, when the blower is raised, as shown in Fig. 1, or may occupy any degree of folding between the limits of movement, as hereinafter described. The lower section, G, is also provided with a projected lug, $h^8$, adapted to the groove $h^9$, (see Fig. 4,) the operation of which will be hereinafter explained.

In the front plate, A, there is provided a recess, B, of such a depth from a line vertical with the face of the face column $a\ a$ as will receive the blower when raised and folded, as shown in Fig. 1. The said front plate, A, is also provided with a longitudinal semicircular groove, $b$, adapted to receive and conform to the upper edge of section F of the blower, about which the said blower may be rotated. The upper section of the columns $a\ a$, from the top to $z$, are cut away, forming a shoulder, $a^2$, in which are formed journal-bearings $b^2$, adapted to receive the journals $d'$ of the blower-shaft, and in which the said journals may be rotated to raise and lower the blower. There is also provided a projected cap-piece, D, having near its lower end semicircular bearings $d^7$, adapted to rest against the journals $d'$, forming a cap or binder for the journals. The upper end of the cap is extended out, as shown in Fig. 1, for the purpose of forming a chamber, $d^5$, into which the counter-weights $d^3$ may pass when the blower is down, thus allowing the weight to stand about vertically over the shaft, and when the blower is raised to its upper position the weight $d^3$ may be suspended under the shaft, thus providing for a full half-revolution of the shaft $d$. The cap D may be secured in position by a screw or bolt in perforations $d^6$. There is also provided on the front plate, A, and integral therewith, a way, $k$, for the blower to rest upon when down, and upon which the lower edge may rest as the blower is raised or lowered.

The face-piece $k'$ having a projected rib, $k^2$, when said cap is placed upon the front plate, as shown in Figs. 1 and 4, a passage-way or groove, $h^9$, may be formed, in which the lug $h^8$ may be moved up and down as the blower is raised or lowered. By these means the movements of the blower may be restrained in its up and down movements, so as not to allow the lower edge of the blower to swing out or away from the way $k$, provided for it to rest upon.

Having thus fully described the nature and object of my invention, what I claim, and desire to secure by Letters Patent, is—

1. In a stove, the combination, with a blower formed of two sections having their adjacent edges curved and adapted one to the other in semicircular form, a through-bolt forming a hinge, guiding-lug $h^8$, supporting-journals $d'$, projecting wings $d^2$, and the counter-weights $d^3$, substantially as described, and for the purpose set forth.

2. In a stove, the combination, with front plate, A, having a recess, B, groove $b$, shoulders $a^2$, journal-bearings $b^2$, guideway $k$, and groove $h^9$, of a sectional blower hinged to the front plate and provided with a lug adapted to travel in the groove $h^9$, substantially as described, and for the purpose set forth.

3. The combination, with the plate A, as described, face-piece $k'$, and caps D, of a sectional blower adapted to rest on said face-plate and counter-weights secured to the blower, substantially as described, and for the purpose set forth.

4. In a stove, the combination, with the front plate, A, and the face-piece $k'$, of the sectional blower, substantially as described, hinged to the front plate and provided at its lower end with a rib adapted to engage the piece $k'$, substantially as set forth.

In testimony whereof I have hereunto set my hand this 13th day of August, A. D. 1886.

JACOB F. HESS.

Witnesses:
W. K. MILLER,
ALFRED BIERCE.